(12) United States Patent
Chien et al.

(10) Patent No.: US 7,435,697 B2
(45) Date of Patent: Oct. 14, 2008

(54) CERAMIC POWDER COMPOSITION, CERAMIC MATERIAL, AND LAMINATED CERAMIC CONDENSER COMPRISED THEREOF

(75) Inventors: Ting-An Chien, Tainan County (TW); Hsiu-Hsiang Pei, Kaohsiung (TW)

(73) Assignee: Darfon Electronics Corp., Kweishan Taoyuan (TW)

( * ) Notice: Subject to any disclaimer, the term of this patent is extended or adjusted under 35 U.S.C. 154(b) by 95 days.

(21) Appl. No.: 11/295,529

(22) Filed: Dec. 7, 2005

(65) Prior Publication Data
US 2006/0126266 A1 Jun. 15, 2006

(30) Foreign Application Priority Data
Dec. 9, 2004 (TW) .............................. 93138090 A

(51) Int. Cl.
*C04B 35/49* (2006.01)
(52) U.S. Cl. ........................ 501/135; 501/136
(58) Field of Classification Search ................ 501/135, 501/136
See application file for complete search history.

(56) References Cited

U.S. PATENT DOCUMENTS

| | | | |
|---|---|---|---|
| 5,204,301 A * | 4/1993 | Ohkubo et al. | 501/136 |
| 6,118,648 A | 9/2000 | Kojima et al. | |
| 6,329,311 B1 * | 12/2001 | Fujii et al. | 501/136 |
| 6,858,554 B2 * | 2/2005 | Moon et al. | 501/136 |
| 7,079,374 B1 * | 7/2006 | Kim et al. | 361/321.4 |
| 7,172,985 B2 * | 2/2007 | Pinceloup et al. | 501/135 |

FOREIGN PATENT DOCUMENTS

JP 2005-213138 * 8/2005

OTHER PUBLICATIONS

Machine translation of JP 2005213138, Aug. 2005.*

* cited by examiner

*Primary Examiner*—Karl E. Group
(74) *Attorney, Agent, or Firm*—Birch, Stewart, Kolasch & Birch, LLP

(57) ABSTRACT

A ceramic powder composition, ceramic material, and laminated ceramic condenser comprised thereof. The composition includes ceramic powders comprising $(Sr_xCa_{1-x})Ti_yZr_{1-y}O_3$, and a sintering aid, wherein x is between 0 and 1, and y is between 0 and 0.1. The sintering aid is $M^a_2O$, $M^bO$, $M^c_2O_3$, $M^dO_2$, or a combination thereof. Element $M^a$ comprises Li, Na, K, or a combination thereof. Element $M^b$ comprises Be, Mg, Ca, Sr, Ba, or a combination thereof. Element $M^c$ comprises B, Al, Ga, or a combination thereof. Element $M^d$ comprises Si, Ge, or a combination thereof.

1 Claim, 3 Drawing Sheets

CERAMIC POWDER COMPOSITION, CERAMIC MATERIAL, AND LAMINATED CERAMIC CONDENSER COMPRISED THEREOF

BACKGROUND OF THE INVENTION

1. Field of the Invention

The invention relates to ceramic compositions, and in particular to ceramic powder composition utilized in passive devices.

2. Description of the Related Art

Ceramic materials with a main component of titanate are typically utilized as a dielectric of a conventional laminated ceramic condenser. The titanates become semiconductors due to reductive reaction thereof during sintering thereof under neutral or reductive atmosphere. Thus, the titanates are typically sintered under an oxidized atmosphere. As a result, it is necessary for inner electrodes of the condenser to have a melting point higher than the sintering temperature and to not oxidize under an oxidized atmosphere. It is thus necessary to utilize noble metals such as Pd or Pt as the inner electrodes, substantially increasing process cost of the laminated ceramic condenser.

Kojima et al. disclose a non-reductive ceramic material having a main component represented by $[(Ca_xSr_{1-x})O]_m[(Ti_yZr_{1-x})O_2]$, wherein x is between 0 and 1, y is between 0 and 0.10, and m is between 0.75 and 1.04, and an auxiliary component containing 0.2-5 mol % (calculated MnO) of Mn oxide, 0.1-10 mol % (calculated as $Al_2O_3$) of Al oxide and 0.5-15 mol % of a component of $[(Ba_zCa_{1-z})O]_vSiO_2$, wherein z is between 0 and 1, and v is between 0.5 and 4.0 in U.S. Pat. No. 6,118,648. The sintering temperature of the ceramic material does not exceed 1300° C., and Ni, having a melting point of 1455° C., can be utilized as inner electrodes.

With development of high-frequency components, the inner electrodes thereof require materials with low impedance such as Cu having a melting point of 1085° C. Kojima et al., however, do not disclose the technology to lower the sintering temperature below 1085° C., and thus, it is difficult to introduce copper inner electrodes to the ceramic materials disclosed by Kojima et al.

SUMMARY OF THE INVENTION

The invention provides ceramic powder compositions, ceramic materials, and laminated ceramic condensers comprised thereof, capable of sintering at a temperature lower than the melting point of copper, enabling copper, with lower impedance, utilizing inner electrodes of the laminated ceramic condensers.

The invention provides a ceramic powder composition comprising about 80 to about 90 weight percent of ceramic powders comprising $(Sr_xCa_{1-x})Ti_yZr_{1-y}O_3$, and about 10 to about 20 weight percent of a sintering aid of $M^a_2O$, $M^bO$, $M^c_2O_3$, $M^dO_2$, or a combination thereof, wherein x is between 0 and 1, y is between 0 and 0.1, element $M^a$ comprises Li, Na, K, or a combination thereof, element $M^b$ comprises Be, Mg, Ca, Sr, Ba, or a combination thereof, element $M^c$ comprises B, Al, Ga, or a combination thereof, and element $M^d$ comprises Si, Ge, or a combination thereof.

The invention further provides a ceramic material sintered from the ceramic powder composition, wherein the sintering temperature thereof is between 900 and 1000° C.

The invention further provides a laminated ceramic condenser comprising a ceramic dielectric, a plurality of parallel inner electrodes, and a pair of outer electrodes. The ceramic dielectric is sintered from the ceramic powder composition, wherein the sintering temperature thereof is between 900 and 1000° C. The parallel inner electrodes extend in the ceramic dielectric. The outer electrodes are exposed on the ceramic dielectric and electrically connect the inner electrodes.

Further scope of the applicability of the invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

Figure 1:
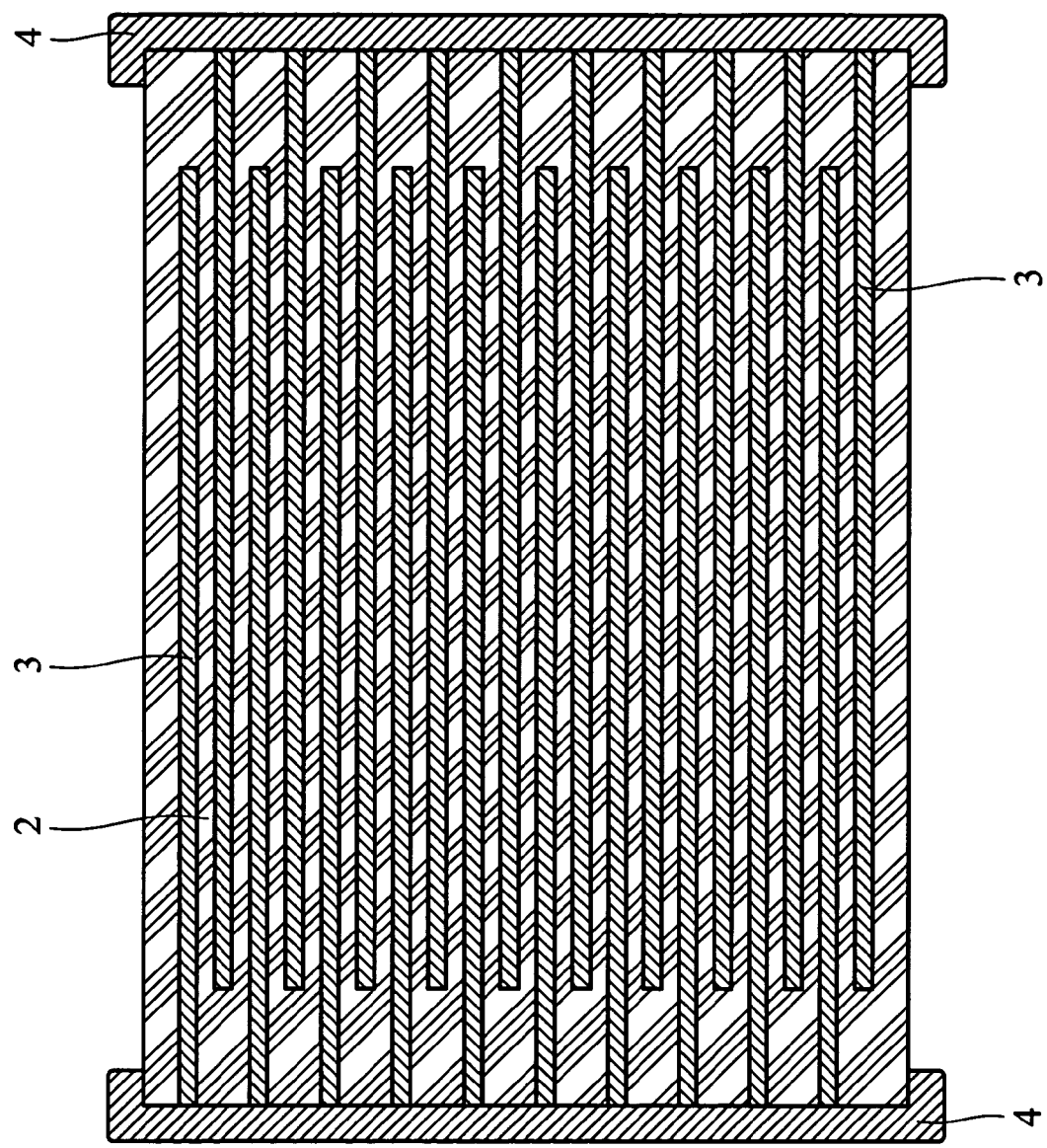
FIG. 1 is a cross-section of a laminated ceramic condenser of a preferred embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

The inventors found the sintering temperature of ceramic powders comprising $(Sr_xCa_{1-x})Ti_yZr_{1-y}O_3 (0 \leq x \leq 1, 0 \leq y \leq 0.1)$ can be lowered to between 900 and 1000° C. when an inventive sintering aid is added thereto. The temperature is lower than the melting point of copper, allowing utilization of Cu as inner electrodes of laminated ceramic condensers. The inventive sintering aid is $M^a_2O$, $M^bO$, $M^c_2O_3$, $M^dO_2$, or a combination thereof, wherein element $M^a$ comprises Li, Na, K, or a combination thereof, element $M^b$ comprises Be, Mg, Ca, Sr, Ba, or a combination thereof, the element $M^c$ comprises B, Al, Ga, or a combination thereof, and the element $M^d$ comprises Si, Ge, or a combination thereof. The inventive sintering aid preferably comprises more than 50 weight percent but less than 100 weight percent of $M^dO_2$, 10 weight percent of $M^c_2O_3$ or less, 10 to 30 weight percent of $M^bO$, and 10 weight percent of $M^a_2O$ or less.

In an embodiment, the inventive sintering aid comprises a combination of four oxides selected from each of groups $M^a_2O$, $M^bO$, $M^c_2O_3$, and $M^dO_2$. For example, the inventive sintering aid may comprise $Li_2O$—$BaO$—$Al_2O_3$—$SiO_2$ or $Li_2O$—$BaO$—$B_2O_3$—$SiO_2$, or alternatively, $Li_2O$ may be replaced by $Na_2O$ or $K_2O$, BaO may be replaced by BeO, MgO, CaO, or SrO, $Al_2O_3$ or $B_2O_3$ may be replaced by $Ga_2O_3$, and $SiO_2$ may be replaced by $GeO_2$. In an alternative embodiment, the inventive sintering aid comprises a combination of five oxides, wherein three are selected from each of groups $M^a_2O$, $M^bO$, and $M^dO_2$, and two are selected from group $M^c_2O_3$. The inventive sintering aid preferably comprises $Li_2O$—$BaO$—$B_2O_3$—$Al_2O_3$—$SiO_2$, allowing lowering of the sintering temperature below 950° C., or alternatively, $Li_2O$ may be replaced by $Na_2O$ or $K_2O$, BaO may be replaced by BeO, MgO, CaO, or SrO, $Al_2O_3$ or $B_2O_3$ may be replaced by $Ga_2O_3$, and $SiO_2$ may be replaced by $GeO_2$. In an alternative embodiment, the inventive sintering aid comprises a combination of six or more oxides selected from each of groups $M^a_2O$, $M^bO$, $M^c_2O_3$, and $M^dO_2$ as desired.

A novel ceramic powder composition of the invention comprises ceramic powders and a sintering aid. The ceramic powders comprise $(Sr_xCa_{1-x})Ti_yZr_{1-y}O_3$ powders, wherein x is between 0 and 1, and y is between 0 and 0.1. The sintering aid is $M^a_2O$, $M^bO$, $M^c_2O_3$, and $M^dO_2$, or a combination thereof, wherein the element $M^a$ comprises Li, Na, K, or a combination thereof, the element $M^b$ comprises Be, Mg, Ca, Sr, Ba, or a combination thereof, the element $M^c$ comprises B, Al, Ga, or a combination thereof, and the element $M^d$ comprises Si, Ge, or a combination thereof. The ceramic powder composition may comprise any ratio of the ceramic powders and the sintering aid as desired product properties, and preferably comprises about 80 to about 90 weight percent of the ceramic powders and about 10 to about 20 weight percent of the sintering aid. More preferably, y is between 0 and 0.05. The ceramic powder composition may further comprise an additive such as oxides of Mn, oxides of Mg, or a combination thereof. The content of the additive in the ceramic powder composition is preferably as large as 1.5 weight percent or less, and more preferably as large as 1 weight percent or less.

In some cases, the ceramic powder composition of the invention is utilized in a laminated ceramic condenser as shown in FIG. 1. The ceramic powder composition of the invention is mixed with an organic carrier to form slurry, followed by tape casting to form green sheets. The green sheets are then laminated with the inner electrodes, and the laminated bodies are co-sintered at a temperature between 900 and 1000° C. The sintered green sheets become the ceramics 2 shown in FIG. 1, acting as ceramic dielectrics of the laminated ceramic condensers.

The parallel inner electrodes 3 extend in the ceramic dielectric 2, and the terminals thereof are alternatively exposed on opposing surfaces of the ceramic dielectric 2. Finally, a pair of outer electrodes 4 is formed on the opposing surfaces of the ceramic dielectric 2, electrically connecting to the corresponding inner electrodes. Thus, the laminated ceramic condenser is complete.

When sintering the ceramic powder composition of the invention, the sintering atmosphere is preferably reductive, utilizing an atmosphere such as a mixed atmosphere of hydrogen and nitrogen, or nitrogen atmosphere. A ratio of sintered density to theoretical density of the ceramic dielectric 2 is preferably between 0.9 and 1. In one embodiment, the inner electrodes comprise copper.

Several examples of the ceramic powder composition, ceramic material, and laminated ceramic condenser are listed as follows. Note that the materials and process described in these examples are not intended to limit the scope of the invention. Those skilled in the art will recognize the possibility of using various materials and processes to achieve the described ceramic powder composition, ceramic material, and laminated ceramic condenser.

The subsequent examples utilize ceramic powders comprising $(Sr_xCa_{1-x})Ti_yZr_{1-y}O_3$, wherein x is between 0 and 1, and y is between 0 and 0.1, and a sintering aid comprising $Li_2O$—$BaO$—$B_2O_3$—$Al_2O_3$—$SiO_2$, wherein the content of $SiO_2$ in the sintering aid is more than 50 weight percent, the content of $B_2O_3$—$Al_2O_3$ in the sintering aid is 10 weight percent or less, the content of BaO in the sintering aid is between 10 and 30 weight percent, and the content of $Li_2O$ in the sintering aid is 10 weight percent or less.

EXAMPLE 1

Approximately 95 weight percent of the ceramic powders and approximately 5 weight percent of the sintering aid were passed through a 400-mesh, followed by mixing with an organic carrier such as polyvinyl alcohol (PVA) to form ceramic slurry. The ceramic slurry was then pressed under approximately 5 kgw/cm² to form green sheets. The green sheets, divided into four groups, were respectively sintered under two atmospheres (air and a mixture of nitrogen and hydrogen) and at three temperatures (approximately 900° C., approximately 950° C., and approximately 1000° C.) for approximately 120 minutes. The sintering process comprised degreasing, during which the green sheets were heated at a rate of approximately 1° C./min. to slowly remove the organic carrier therein, and remained at approximately 300° C. for 60 minutes to completely remove the organic carrier, and main sintering, during which the degreased sheets were put in furnaces under the desired atmosphere, heated to the desired sintering temperature for at most approximately 200 minutes, and then remained at the desired temperature for approximately 120 minutes, followed by air cooling to terminate sintering. Finally, the densities of the sintered sheets were measured and compared with the theoretical density. The results are listed in Table 1. In this example, the ratios of the sintered densities of the four groups of sintered sheets to the theoretical density were all less than 90%.

EXAMPLE 2

In addition to the contents of the ceramic powders and the sintering aid, the process and measurement steps utilized here are the same as those in Example 1. Here, the ceramic powder composition comprises approximately 90 weight percent of the ceramic powders and approximately 10 weight percent of the sintering aid, both completely mixed by a ball mill, followed by being passed through the 400-mesh. After sintering, the densities of the sintered sheets were measured and compared with the theoretical density. The results are listed in Table 1. In this example, the ratios of the sintered densities of the four groups of sintered sheets to the theoretical density may be greater than 90%.

EXAMPLE 3A

In addition to the contents of the ceramic powders and the sintering aid, the process and measurement steps utilized here are the same as those in Example 2. Here, the ceramic powder composition comprises approximately 90 weight percent of the ceramic powders, approximately 9 weight percent of the sintering aid, and approximately 1 weight percent of an additive comprising $MnO_2$. After sintering, the densities of the sintered sheets were measured and compared with the theoretical density. The results are listed in Table 1. In this example, the ratios of the sintered densities of the four groups of sintered sheets to the theoretical density can be greater than 90%.

EXAMPLE 3B

In addition to the contents of the ceramic powders and the sintering aid, the process and measurement steps utilized here are the same as those in Example 2. Here, the ceramic powder composition comprises approximately 90 weight percent of the ceramic powders, approximately 9.5 weight percent of the sintering aid, and approximately 0.5 weight percent of an additive comprising MgO. After sintering, the densities of the sintered sheets were measured and compared with the theoretical density. The results are listed in Table 1. In this example, the ratios of the sintered densities of the four groups of sintered sheets to the theoretical density can be greater than 90%.

EXAMPLE 4

In addition to the contents of the ceramic powders and the sintering aid, the process and measurement steps utilized here are the same as those in Example 2. Here, the ceramic powder composition comprises approximately 85 weight percent of the ceramic powders and approximately 15 weight percent of the sintering aid. After sintering, the densities of the sintered sheets were measured and compared with the theoretical density. The results are listed in Table 1. In this example, the ratios of the sintered densities of the four groups of sintered sheets to the theoretical density can be greater than 90%.

EXAMPLE 5A

In addition to the contents of the ceramic powders and the sintering aid, the process and measurement steps utilized here are the same as those in Example 2. Here, the ceramic powder composition comprises approximately 85 weight percent of the ceramic powders, approximately 14 weight percent of the sintering aid, and approximately 1 weight percent of an additive comprising $MnO_2$. After sintering, the densities of the sintered sheets were measured and compared with the theoretical density. The results are listed in Table 1. In this example, the ratios of the sintered densities of the four groups of sintered sheets to the theoretical density can be greater than 90%.

EXAMPLE 5B

In addition to the contents of the ceramic powders and the sintering aid, the process and measurement steps utilized here are the same as those in Example 2. Here, the ceramic powder composition comprises approximately 85 weight percent of the ceramic powders, approximately 14.5 weight percent of the sintering aid, and approximately 0.5 weight percent of an additive comprising MgO. After sintering, the densities of the sintered sheets were measured and compared with the theoretical density. The results are listed in Table 1. In this example, the ratios of the sintered densities of the four groups of sintered sheets to the theoretical density can be greater than 90%.

EXAMPLE 6

In addition to the contents of the ceramic powders and the sintering aid, the process and measurement steps utilized here are the same as those in Example 2. Here, the ceramic powder composition comprises approximately 80 weight percent of the ceramic powders and approximately 20 weight percent of the sintering aid. After sintering, the densities of the sintered sheets were measured and compared with the theoretical density. The results are listed in Table 1. In this example, the ratios of the sintered densities of the four groups of sintered sheets to the theoretical density can be greater than 90%.

EXAMPLE 7A

In addition to the contents of the ceramic powders and the sintering aid, the process and measurement steps utilized here are the same as those in Example 2. Here, the ceramic powder composition comprises approximately 80 weight percent of the ceramic powders, approximately 19 weight percent of the sintering aid, and approximately 1 weight percent of an additive comprising $MnO_2$. After sintering, the densities of the sintered sheets were measured and compared with the theoretical density. The results are listed in Table 1. In this example, the ratios of the sintered densities of the four groups of sintered sheets to the theoretical density can be greater than 90%.

EXAMPLE 7B

In addition to the contents of the ceramic powders and the sintering aid, the process and measurement step utilized here were the same as those in Example 2. Here, the ceramic powder composition comprises approximately 80 weight percent of the ceramic powders, approximately 19.5 weight percent of the sintering aid, and approximately 0.5 weight percent of an additive comprising MgO. After sintering, the densities of the sintered sheets were measured and compared with the theoretical density. The results are listed in Table 1. In this example, the ratios of the sintered densities of the four groups of sintered sheets to the theoretical density can be greater than 90%.

EXAMPLE 8

In addition to the contents of the ceramic powders and the sintering aid, the process and measurement steps utilized here are the same as those in Example 2. Here, the ceramic powder composition comprises approximately 80 weight percent of the ceramic powders, approximately 18.5 weight percent of the sintering aid, and approximately 1.5 weight percent of an additive, comprising approximately 1 weight percent of $MnO_2$ and approximately 0.5 weight percent of an additive comprising MgO. After sintering, the densities of the sintered sheets were measured and compared with the theoretical density.

The results are listed in Table 1. In this example, the ratios of the sintered densities of the four groups of sintered sheets to the theoretical density can be greater than 90%.

TABLE 1

| Example | sintering atmosphere | sintering temperature °C. | theoretical density (gm/cm$^3$) | sintering density (gm/cm$^3$) | density ratio of theoretical to sintering (%) |
|---|---|---|---|---|---|
| 1 | mixture of nitrogen and hydrogen | 900 | 5.21 | 4.42 | 84.7 |
| 1 | mixture of nitrogen and hydrogen | 950 | 5.21 | 4.15 | 79.7 |
| 1 | mixture of nitrogen and hydrogen | 1000 | 5.21 | 4.54 | 87.1 |

TABLE 1-continued

| Example | sintering atmosphere | sintering temperature °C. | theoretical density (gm/cm³) | sintering density (gm/cm³) | density ratio of theoretical to sintering (%) |
|---|---|---|---|---|---|
| 1 | nitrogen | 950 | 5.21 | 4.06 | 77.9 |
| 2 | mixture of nitrogen and hydrogen | 900 | 5.00 | 4.22 | 84.3 |
| 2 | mixture of nitrogen and hydrogen | 950 | 5.00 | 4.17 | 83.3 |
| 2 | mixture of nitrogen and hydrogen | 1000 | 5.00 | 4.57 | 91.4 |
| 2 | nitrogen | 950 | 5.00 | 4.07 | 81.3 |
| 3A | mixture of nitrogen and hydrogen | 900 | 4.98 | 4.25 | 85.2 |
| 3A | mixture of nitrogen and hydrogen | 950 | 4.98 | 4.64 | 93.2 |
| 3A | mixture of nitrogen and hydrogen | 1000 | 4.98 | 4.79 | 96.1 |
| 3A | nitrogen | 950 | 4.98 | 4.52 | 90.7 |
| 3B | mixture of nitrogen and hydrogen | 900 | 5.00 | 4.10 | 81.9 |
| 3B | mixture of nitrogen and hydrogen | 950 | 5.00 | 4.24 | 84.7 |
| 3B | mixture of nitrogen and hydrogen | 1000 | 5.00 | 4.61 | 92.2 |
| 3B | nitrogen | 950 | 5.00 | 4.18 | 83.6 |
| 4 | mixture of nitrogen and hydrogen | 900 | 4.83 | 3.99 | 82.5 |
| 4 | mixture of nitrogen and hydrogen | 950 | 4.83 | 4.23 | 87.4 |
| 4 | mixture of nitrogen and hydrogen | 1000 | 4.83 | 4.73 | 97.8 |
| 4 | nitrogen | 950 | 4.83 | 4.09 | 84.6 |
| 5A | mixture of nitrogen and hydrogen | 900 | 4.82 | 3.93 | 81.7 |
| 5A | mixture of nitrogen and hydrogen | 950 | 4.82 | 4.55 | 94.5 |
| 5A | mixture of nitrogen and hydrogen | 1000 | 4.82 | 4.59 | 95.4 |
| 5A | nitrogen | 950 | 4.82 | 4.48 | 93.1 |
| 5B | mixture of nitrogen and hydrogen | 900 | 4.83 | 4.01 | 83.0 |
| 5B | mixture of nitrogen and hydrogen | 950 | 4.83 | 4.06 | 84.1 |
| 5B | mixture of nitrogen and hydrogen | 1000 | 4.83 | 4.47 | 92.4 |
| 5B | nitrogen | 950 | 4.83 | 3.96 | 81.8 |
| 6 | mixture of nitrogen and hydrogen | 900 | 4.69 | 3.79 | 80.9 |
| 6 | mixture of nitrogen and hydrogen | 950 | 4.69 | 4.13 | 88.0 |
| 6 | mixture of nitrogen and hydrogen | 1000 | 4.69 | 4.53 | 96.5 |
| 6 | nitrogen | 950 | 4.69 | 4.00 | 85.2 |
| 7A | mixture of nitrogen and hydrogen | 900 | 4.68 | 3.66 | 78.2 |
| 7A | mixture of nitrogen and hydrogen | 950 | 4.68 | 4.51 | 96.5 |
| 7A | mixture of nitrogen and hydrogen | 1000 | 4.68 | 4.46 | 95.3 |
| 7A | nitrogen | 950 | 4.68 | 4.44 | 95.0 |
| 7B | mixture of nitrogen and hydrogen | 900 | 4.69 | 3.73 | 79.6 |
| 7B | mixture of nitrogen and hydrogen | 950 | 4.69 | 4.01 | 85.4 |
| 7B | mixture of nitrogen and hydrogen | 1000 | 4.69 | 4.69 | 100.0 |
| 7B | nitrogen | 950 | 4.69 | 3.94 | 83.9 |
| 8 | mixture of nitrogen and hydrogen | 900 | 4.69 | 3.89 | 82.9 |
| 8 | mixture of nitrogen and hydrogen | 950 | 4.69 | 4.32 | 92.1 |
| 8 | mixture of nitrogen and hydrogen | 1000 | 4.69 | 4.58 | 97.6 |
| 8 | nitrogen | 950 | 4.69 | 4.27 | 91.1 |

In addition to Example 1, the conditions of other examples match the ceramic powder composition comprising about 80 to about 90 weight percent of the ceramic powders and about 10 to about 20 weight percent of the sintering aid, which can be sintered at a temperature between 900 and 1000° C., resulting in the ratio of sintering density to theoretical density potentially as large as 0.9 or greater. Thus, inner electrodes comprising copper can be co-sintered with the inventive ceramic powder composition to produce the laminated ceramic condenser of the invention.

Further, the ceramic powder composition of the invention can be shaped by a conventional process such as dry pressing, cold isostatic pressing (CIP), hot isostatic pressing (HIP), or other methods to form ceramic bodies of different shapes for various usages. For example, the ceramic powder composition of the invention can be with water and a binder such as PVA, followed by performance of spray granulation to improve the mobility of the powders. A series of processes comprising dry pressing, degreasing, and sintering is performed utilizing the resulting powders to produce a dielectric ceramic product.

Figure 2:
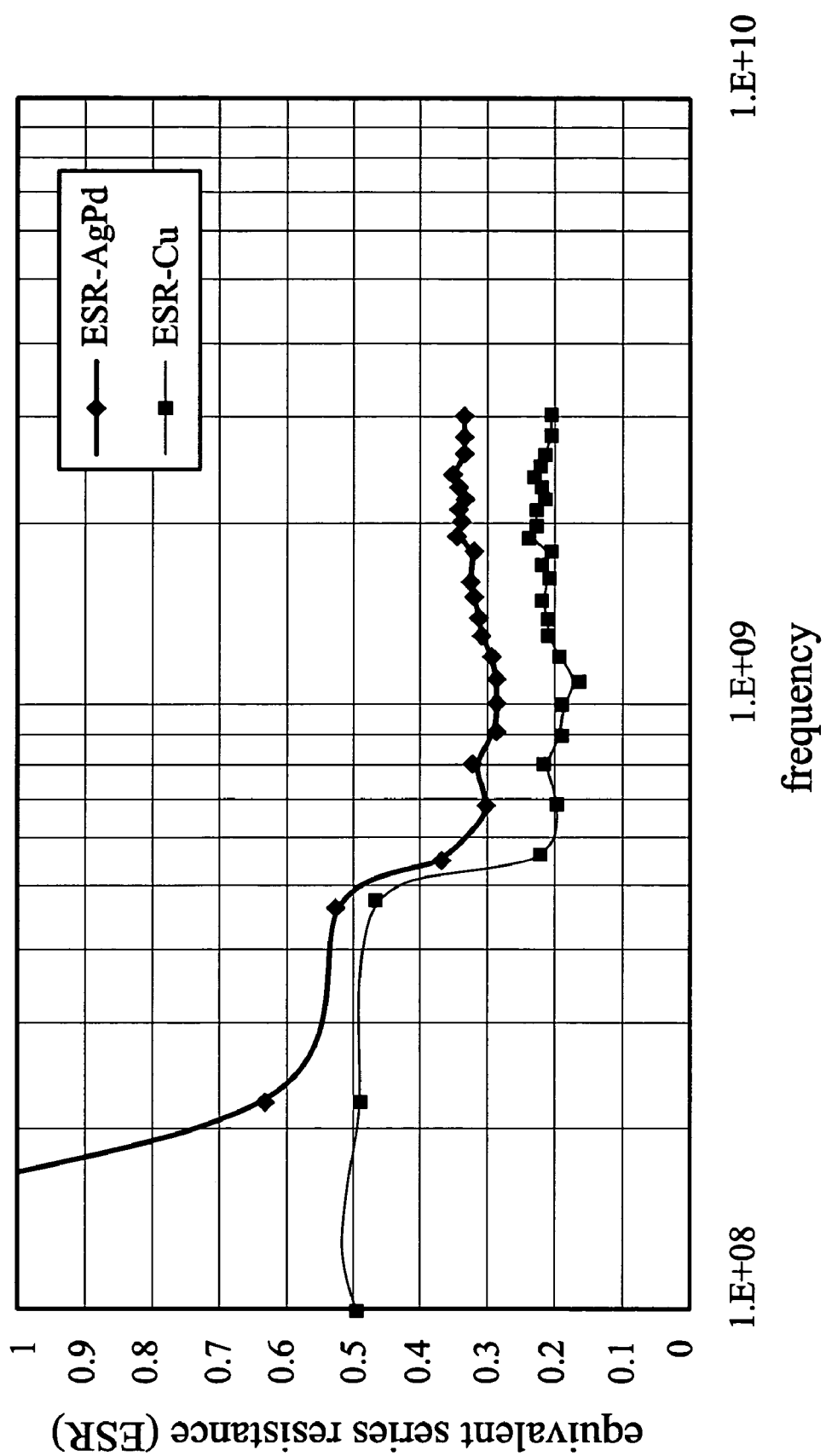
FIG. 2 is a graphic chart showing equivalent series resistances (ESR) of inventive and conventional laminated ceramic condensers, wherein the inventive condenser utilizes copper inner electrodes and the ceramic materials of example 5A of the invention, while the conventional condenser utilizes silver-palladium inner electrodes and conventional ceramic materials.
Figure 3:
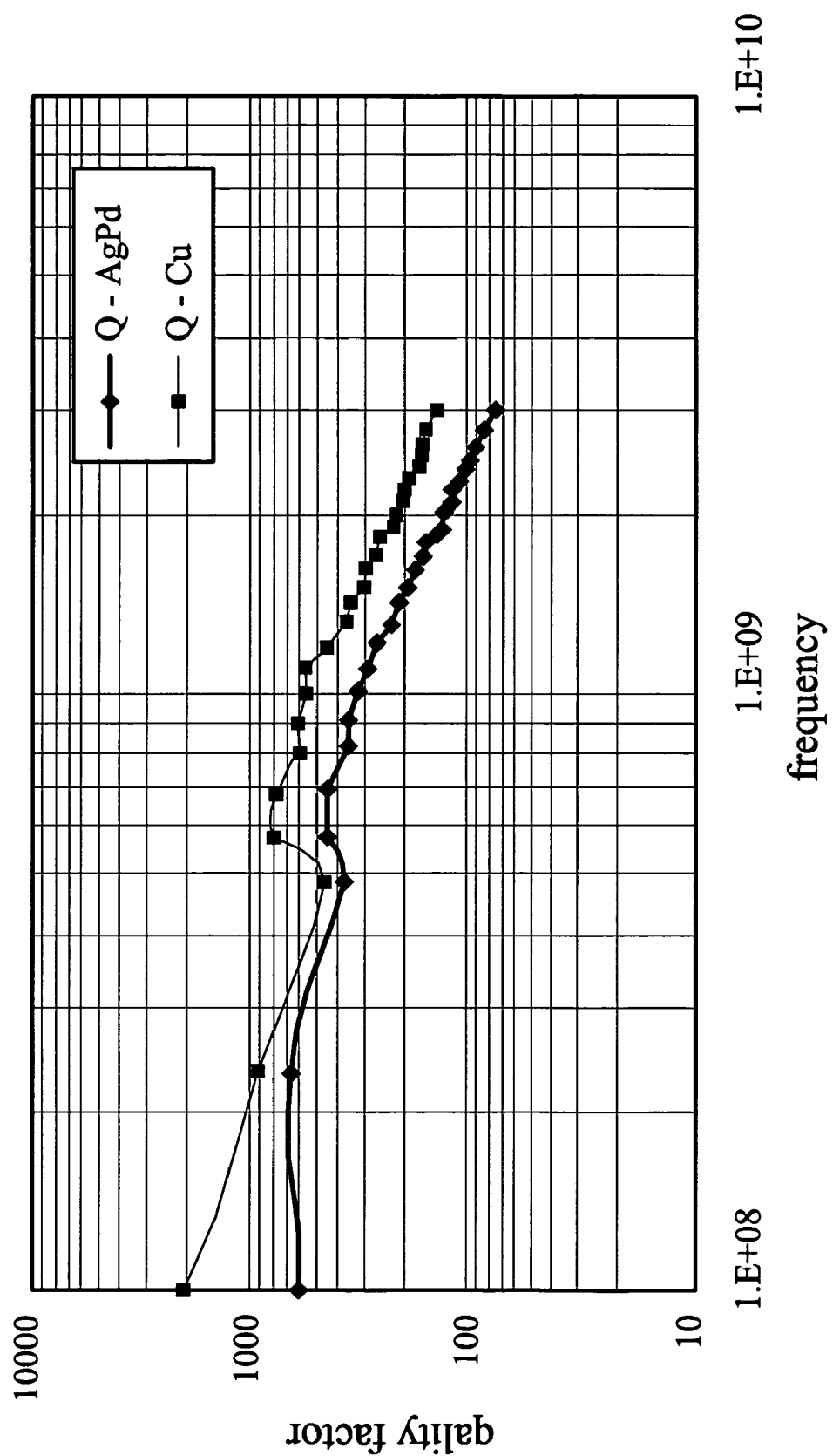
FIG. 3 is a graphic chart showing quality factors of inventive and conventional laminated ceramic condensers, wherein the inventive condenser utilizes copper inner electrodes and the ceramic materials of example 5A of the invention, while the conventional condenser utilizes silver-palladium inner electrodes and conventional ceramic materials.

FIG. 2 is a graphic chart showing equivalent series resistances (ESR) of an inventive and a conventional laminated ceramic condensers, and FIG. 3 is a graphic chart showing quality factors (Q values) thereof, wherein the inventive condenser utilizes copper inner electrodes and the ceramic materials of the example 5A of the invention, while the conventional condenser utilize silver-palladium inner electrodes and conventional ceramic materials. The data of FIGS. 2 and 3 shows the inventive condenser utilizing copper inner electrodes and the ceramic materials of the example 5A of the invention has lower ESR and higher Q value, improving the electrical performance thereof. Furthermore, the specification of the condensers utilized for FIGS. 2 and 3 is NP0/1005/1.5 pF.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A ceramic powder composition, comprising
ceramic powders composed of $(Sr_xCa_{1-x})Ti_yZr_{1-y}O_3$, wherein x is between 0 and 1, and y is between 0 and 0.1; and
a sintering aid comprises $Li_2O$—$BaO$—$B_2O_3$—$Al_2O_3$—$SiO_2$,
wherein the ceramic powders and sintering aid are about 80-90% and 10-20%, respectively, of the total weight of the sintered composition.

* * * * *